US009485596B2

(12) United States Patent
Browne

(10) Patent No.: US 9,485,596 B2
(45) Date of Patent: Nov. 1, 2016

(54) UTILIZING A SMARTPHONE DURING A PUBLIC ADDRESS SYSTEM SESSION

(71) Applicant: Citrix Systems, Inc., Fort Lauderdale, FL (US)

(72) Inventor: Jeffrey Casper Browne, San Francisco, CA (US)

(73) Assignee: GetGo, Inc., Ford Lauderdale, FL (US)

( * ) Notice: Subject to any disclaimer, the term of this patent is extended or adjusted under 35 U.S.C. 154(b) by 127 days.

(21) Appl. No.: 14/460,592

(22) Filed: Aug. 15, 2014

(65) Prior Publication Data

US 2016/0050504 A1 Feb. 18, 2016

(51) Int. Cl.
*H04B 3/20* (2006.01)
*H04R 27/00* (2006.01)
*H04L 12/18* (2006.01)

(52) U.S. Cl.
CPC .............. *H04R 27/00* (2013.01); *H04L 12/18* (2013.01); *H04R 2227/003* (2013.01); *H04R 2227/007* (2013.01); *H04R 2227/009* (2013.01)

(58) Field of Classification Search
None
See application file for complete search history.

(56) References Cited

U.S. PATENT DOCUMENTS

| | | | |
|---|---|---|---|
| 8,014,421 B2 | 9/2011 | Rao et al. | |
| 8,046,830 B2 | 10/2011 | Rao et al. | |
| 8,994,781 B2 | 3/2015 | Anderson et al. | |
| 9,049,299 B2 | 6/2015 | Nord | |
| 9,111,105 B2 | 8/2015 | Barton et al. | |
| 2007/0115948 A1* | 5/2007 | Dasgupta | H04N 7/147 370/356 |
| 2008/0101577 A1* | 5/2008 | Frankel | H04M 3/56 379/202.01 |
| 2009/0060218 A1 | 3/2009 | Sherman | |
| 2009/0181659 A1* | 7/2009 | Stalnacke | G06Q 10/1093 455/416 |
| 2010/0150373 A1 | 6/2010 | Sheth et al. | |
| 2010/0215187 A1 | 8/2010 | Moosavi et al. | |
| 2011/0317593 A1* | 12/2011 | Bonkowski | H04L 12/1827 370/260 |
| 2013/0216063 A1 | 8/2013 | Sherman et al. | |

OTHER PUBLICATIONS

International Search Report for International Application No. PCT/US2015/044850 mailed from the International Searching Authority on Sep. 30, 2015, 13 pages.
"Web conferencing" (https://en.wikipedia.org/w/index.php?title=Web_conferencing&oldid=619300109), Jul. 31, 2014, Wikipedia, Retrieved Sep. 21, 2015, 5 pages.

* cited by examiner

*Primary Examiner* — Muhammad N Edun
(74) *Attorney, Agent, or Firm* — BainwoodHuang

(57) ABSTRACT

A technique utilizes a smartphone during a public address system session. The technique involves operating a public address system to provide audio from a local human presenter to a local human audience, the local human presenter and the local human audience residing at a common physical public address location. The technique further involves establishing, while operating the public address system to provide audio from the local human presenter to the local human audience, an electronic connection between the smartphone and the public address system. The technique further involves providing, after establishing the electronic connection between the smartphone and the public address system, audio from a user of the smartphone to the local human audience through the smartphone, the electronic connection, and the public address system.

20 Claims, 5 Drawing Sheets

FIG. 3

Voting Results for Top Five Topics

Suggestion #1    40%

Suggestion #2    25%

Suggestion #3    15%

Suggestion #4    10%

Suggestion #5    3%

Total Votes: 25,773

FIG. 4

UTILIZING A SMARTPHONE DURING A PUBLIC ADDRESS SYSTEM SESSION

BACKGROUND

Large public events often use public address systems to broadcast human voices to groups of people. For example, a human presenter at the front of a large room or on stage at an auditorium may use a public address system to make a presentation, a speech, an announcement, etc.

One conventional public address system includes a microphone, an amplifier and loudspeakers. During operation, the amplifier receives a microphone signal carrying the presenter's voice from the microphone. The amplifier then provides a speaker signal carrying the presenter's voice to the loudspeakers which, in turn, outputs the presenter's voice to the listening audience.

In some situations, the human presenter may wish to receive a question or a comment from a member of the audience over the public address system. For example, in the context of a large room, the human presenter may physically carry the microphone or physically pass the microphone to that person. As another example, in the context of a large auditorium, another human carrying a second microphone (i.e., a "mic runner") may roam through the audience from one person to another to enable various members of the audience to speak using the public address system.

SUMMARY

Unfortunately, there are deficiencies to the above-described conventional public address system. Along these lines, a microphone of a public address system can be a single point of failure. For example, some public address systems may not be equipped with a backup microphone. Accordingly, if the microphone fails, the public address system becomes completely unusable. Moreover, in the context of a large room in which it is desirable to include a member of the audience on the public address system, the human presenter has the burden of physically carrying the microphone or physically passing the microphone to that person.

Additionally, in the context of a large setting such as an auditorium which has mic runners prepared to carry additional microphones among the audience to field questions, the mic runners may not notice everyone in the audience. Also, even if the mic runners are good at including members of the audience, mic runners cost money to employ, and their time and effort could be better spent on other less menial tasks (e.g., technical audio-video tasks, etc.).

Furthermore, for a large group event that includes a local audience and extra conferencing at satellite locations, remote viewers at the satellite locations are often completely left out of the audience participation segment. Specifically, members of the satellite audience have no means to speak to the meeting as a whole, i.e., no means to ask a question, no means to make a comment, and so on.

In contrast to the above-described conventional public address systems which have microphone restrictions, improved techniques are directed to utilizing a smartphone during a public address system session. In particular, while an enhanced public address system operates to provide audio from a local human presenter to a local human audience, a smartphone user is able to establish an electronic connection between the smartphone and the public address system, and then contribute via the smartphone, the electronic connection, and the public address system.

With such techniques, the microphone of the local human presenter is not a potential single point of failure. Rather, if the presenter's microphone fails, the presenter is able to connect a smartphone to the public address system, and then use the microphone of the smartphone thereafter. Additionally, when it is desirable for a member of an audience to use the public address system, the member of the audience can simply join to the public address system via a smartphone thus alleviating the need for the presenter to physically pass the microphone or enlist the assistance of a mic runner. Likewise, attendees conferencing at remote satellite locations have means to participate from their remote satellite locations, e.g., to use their smartphones to ask questions, to make comments, to vote on topics, etc.

One embodiment is directed to a method of utilizing a smartphone during a public address system session. The method includes operating a public address system to provide audio from a local human presenter to a local human audience, the local human presenter and the local human audience residing at a common physical public address location. The method further includes establishing, while operating the public address system to provide audio from the local human presenter to the local human audience, an electronic connection between the smartphone and the public address system. The method further includes providing, after establishing the electronic connection between the smartphone and the public address system, audio from a user of the smartphone to the local human audience through the smartphone, the electronic connection, and the public address system.

In some arrangements, the public address system includes a set of speakers (e.g., loudspeakers, theatre speakers, outdoor speakers, concert speakers, etc.). In these arrangements, operating the public address system to provide audio from the local human presenter to the local human audience includes projecting a voice of the local human presenter from the set of speakers to the local human audience. Additionally, providing audio from the user of the smartphone to the local human audience includes projecting a voice of the user of the smartphone from the set of speakers to the local human audience.

In some arrangements, an online meeting server, which is constructed and arranged to host online meetings, channels an audio signal of a current online meeting to the public address system (e.g., a pre-established communications path between the online meeting server and the public address system). In these arrangements, establishing the electronic connection between the smartphone and the public address system includes joining the smartphone as a client device to the current online meeting to convey audio from the user of the smartphone to the local human audience through the online meeting server and the public address system.

In some arrangements, projecting the voice of the user of the smartphone from the set of speakers to the local human audience includes outputting the voice of the user from the set of speakers while the user of the smartphone resides at the common physical public address location to form part of the local human audience. In these arrangements, the user of the smartphone may sit among the local human audience.

In some arrangements, projecting the voice of the user of the smartphone from the set of speakers to the local human audience includes outputting the voice of the user from the set of speakers while the user of the smartphone resides at a user location which is remote from the common physical public address location. In these arrangements, the user of the smartphone may sit at a remote satellite location rather than among the local human audience.

In some arrangements, the public address system further includes a mixing circuit having (i) a first input which receives a microphone signal carrying audio from the local human presenter, (ii) a second input which receives an online meeting signal from the online meeting server, the online meeting signal carrying audio from the user of the smartphone, and (iii) an output coupled to the set of speakers. In these arrangements, the method further includes generating an output signal based on the microphone signal and the online meeting signal, and providing the output signal from the output to the set of speakers, the output signal including the audio from the local human presenter and the audio from the user of the smartphone at adjusted volume levels.

In some arrangements, the mixing circuit further includes a communications interface. In these arrangements, the method further includes providing the output signal from the communications interface to the online meeting server to convey audio from the local human presenter to participants of the current online meeting.

In some arrangements, the method further includes performing an echo suppression operation to suppress echo in the audio from the user of the smartphone. Such an arrangement reduces or eliminates irritating feedback and/or other audio artifacts (e.g., ringing, echoes, harmonics, etc.) that could otherwise be caused by the microphone of the smartphone picking up the projected sounds from the public address system, creating signal anomalies, and so on.

In some arrangements, the method further includes joining other client devices to the current online meeting, receiving text-based questions from the other client devices joined to the current online meeting, and displaying the text-based questions to the local human audience via the public address system. Moreover, in some arrangements, the method further includes receiving votes for the text-based questions, and displaying results of the votes to the local human audience via the public address system.

In some arrangements, the other client devices are smartphones residing at the common physical public address location. In certain arrangements, joining the other client devices to the current online meeting includes rendering links on touch screens of the smartphones, and receiving requests to join the current online meeting in response to selection of the links on the touch screens of the smartphones. In other arrangements, joining the other client devices to the current online meeting includes reading barcodes via cameras of the smartphones, and receiving requests to join the current online meeting in response to reading the barcodes via the cameras of the smartphones.

In some arrangements, the smartphone includes a camera. In these arrangements, the method further includes capturing video from the camera of the smartphone to share a view of the user's face with the local human audience.

Another embodiment is directed to a public address apparatus which includes a set of speakers, a microphone device, and a control circuit coupled to the set of speakers and the microphone device. The control circuit is constructed and arranged to:
  (A) receive, via the microphone device, audio from a local human presenter and output, via the set of speakers, audio received from the local human presenter to a local human audience, the local human presenter and the local human audience residing at a common physical public address location,
  (B) establish an electronic connection to a smartphone, and
  (C) after establishing the electronic connection to the smartphone, receive audio from a user of the smartphone and output audio received from the user to the local human audience through the smartphone, the electronic connection, and the set of speakers.

Yet another embodiment is directed to a computer program product having a non-transitory computer readable medium which stores a set of instructions to utilize a smartphone during a public address system session. The set of instructions, when carried out by computerized circuitry, cause the computerized circuitry to perform a method of:
  (A) operating a public address system to provide audio from a local human presenter to a local human audience, the local human presenter and the local human audience residing at a common physical public address location;
  (B) while operating the public address system to provide audio from the local human presenter to the local human audience, establishing an electronic connection between the smartphone and the public address system; and
  (C) after establishing the electronic connection between the smartphone and the public address system, providing audio from a user of the smartphone to the local human audience through the smartphone, the electronic connection, and the public address system.

It should be understood that, in the cloud context, some of the electronic circuitry (e.g., the circuitry forming the online meeting server) is formed by remote computer resources distributed over a network. Such a context is capable of providing certain advantages such as higher capacity, load balancing, processing flexibility, performance of specialized operations (e.g., connection of the public address system to the plain old telephone system and the Internet, aggregation of audio feeds from multiple smartphone callers, etc.), and so on.

Other embodiments are directed to electronic systems and apparatus, processing circuits, computer program products, and so on. Some embodiments are directed to various methods, electronic components and circuitry which are involved in utilizing a smartphone during a public address system session.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a view of a touchscreen of a smartphone which has joined the public address system session.

FIG. 4 is a view of a displayed voting output which is achievable during the public address system session.

DETAILED DESCRIPTION

An improved technique is directed to utilizing smartphones during public address system sessions. For example, while an enhanced public address system operates to provide audio from a local human presenter to a local human audience, a smartphone user is able to establish an electronic connection between the smartphone and the public address system, and then contribute input via the smartphone, the electronic connection, and the public address system. With such a technique, the microphone of the local human presenter is not a potential single point of failure. Rather, if the local human presenter's microphone fails, the local human presenter is able to connect a smartphone to the public address system, and then use the microphone of the smartphone thereafter. Additionally, when it is desirable for a member of an audience to use the public address system, the member of the audience can simply join to the public address system via a smartphone thus alleviating the need for the presenter to physically pass the microphone or enlist the assistance of a mic runner. Similarly, attendees conferencing at remote satellite locations have means to participate from their remote satellite locations, e.g., to utilize their smartphones to ask questions, to make comments, to vote on topics, and so on.

Figure 1:
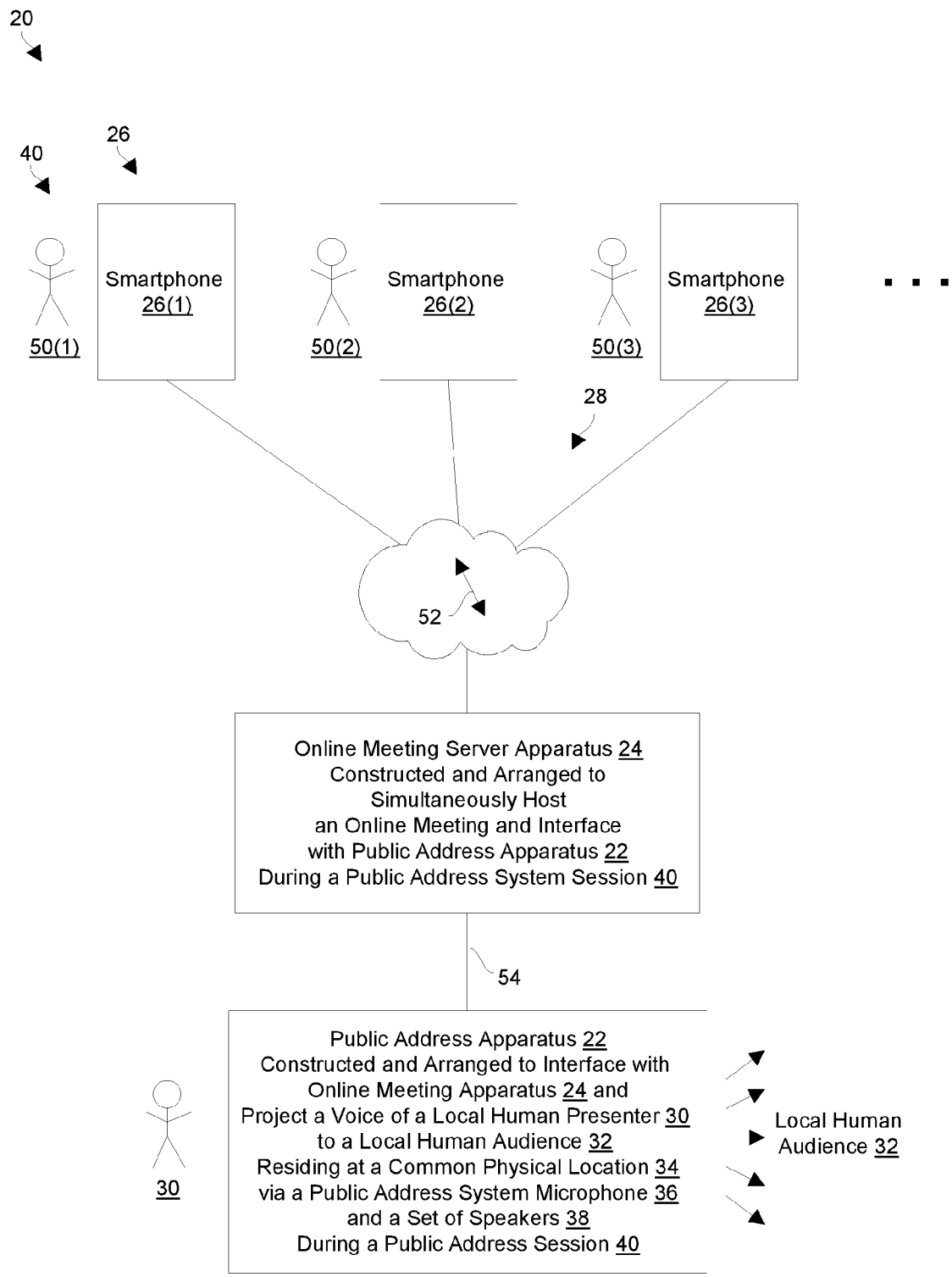
FIG. 1 is a block diagram of an electronic setting which utilizes a smartphone during a public address system session.

FIG. 1 shows an electronic setting 20 which is suitable for utilizing a smartphone during a public address system session. The electronic setting 20 includes a public address apparatus 22, an online meeting server apparatus 24, smartphones 26(1), 26(2), 26(3), . . . , and communications medium 28.

The public address apparatus 22 is constructed and arranged to provide input from a local human presenter 30 to a local human audience 32. Along these lines, the local human presenter 30 and the local human audience 32 reside at a common physical public address location 34 such as a large meeting room, an auditorium, a theatre or staged area, a large outdoor setting, etc. The local human presenter 30 then speaks into a microphone 36 which projects the presenter's voice from a set of speakers 38 (i.e., one or more speakers 38) of the public address apparatus 22 to convey the presenter's voice to the members of the local human audience 32 during a public address session 40.

The online meeting server apparatus 24, which is electronically coupled to the public address apparatus 22 is constructed and arranged to host online meetings among meeting participants. Suitable meeting participants include users 50(1), 50(2), 50(3), . . . (collectively, users 50) which respectively operate the smartphones 26(1), 26(2), 26(3), . . . (collectively, smartphones 26).

Each smartphone 26 receives input from a respective user 50 and provides output to that respective users 50. Such input may include audio input via a microphone of the smartphone 26, video input via a camera or memory (e.g., files, etc.) of the smartphone, commands (e.g., button presses, swipes, typed text-based commands, etc.), and so on. Along these lines, the users 50 are able to schedule, create, and join online meetings which are hosted by the online meeting apparatus 24. Moreover, user input collected by the smartphones 26 can be conveyed by the online meeting apparatus 24 to the public address apparatus 22 so that the voices of the respective users 50 are shared with the local human audience 32. Furthermore, some users 50 may form part of the local human audience 32 while other users 50 reside at remote locations (e.g., at separate satellite locations which are different from the common physical location 34 of the local human audience 32.

In some arrangements, the users 50 are able to share other input with the local human audience 32. For example, users 50 can type in and submit questions to the public address apparatus 22, enter votes on topics/questions/items/etc., share video, and so on.

Moreover, if the local human presenter 30 provides the users 50 with information on how to easily join an online meeting via their smartphones 26 (e.g., a link to a website or server, a two dimensional barcode that identifies a network location, etc.), the users 50 at the common physical location 36 or any satellite location may be able to simply establish connections with the online meeting apparatus 24 and, in turn, access the public address apparatus 22.

The communications medium 28 is constructed and arranged to connect the various components of the electronic setting 20 together to enable various components of the electronic setting 20 to exchange electronic signals 52 (e.g., see the double arrow 52). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, cellular communications, plain old telephone service (POTS) based communications, combinations thereof, and so on.

It should be understood that an electronic communications channel 54 exists between the public address apparatus 22 and the online meeting apparatus 24. The electronic communications channel 54 may be a dedicated physical pathway or a set of network connections through the communications medium 28. Such a channel 54 can be created prior to the meeting (e.g., a pre-established communications path) or created through the communications medium 28 dynamically (i.e., on the fly or on demand).

During operation of the electronic setting 20, the local human presenter 30 conducts a public address system session 40. Along these lines, the public address apparatus 22 receives voice input from the local human presenter 30 via the microphone 36, and projects that voice input to the local human audience 32. However, the public address apparatus 22 also communicates with the online meeting apparatus 24 to enable the smartphone users 50 to connect with the public address apparatus 22 as well. That is, the users 50 are able to establish electronic connections between their respective smartphones 26 and the online meeting apparatus 24 and, once such connections are established, provide input over those connections to the public address apparatus 22.

With such advanced capabilities, the microphone 36 of the local human presenter 32 is not a potential single point of failure. Rather, if the local human presenter's microphone 36 fails, the local human presenter 32 is able to connect a smartphone to the public address system, and then use the microphone of the smartphone 50 thereafter. Additionally, when it is desirable for a member of the local human audience 32 to use the public address apparatus 24, the member of the audience 32 can simply join to the public address apparatus 24 via a smartphone 26 thus alleviating the need for the presenter 30 to physically pass the microphone 36 or enlist the assistance of a mic runner. Similarly, attendees conferencing at remote satellite locations have means to participate from their remote satellite locations, e.g., to utilize their smartphones 50 to ask questions, to make comments, to vote on topics, and so on. Further details of the electronic setting 20 will now be provided with reference to FIG. 2.

Figure 2:
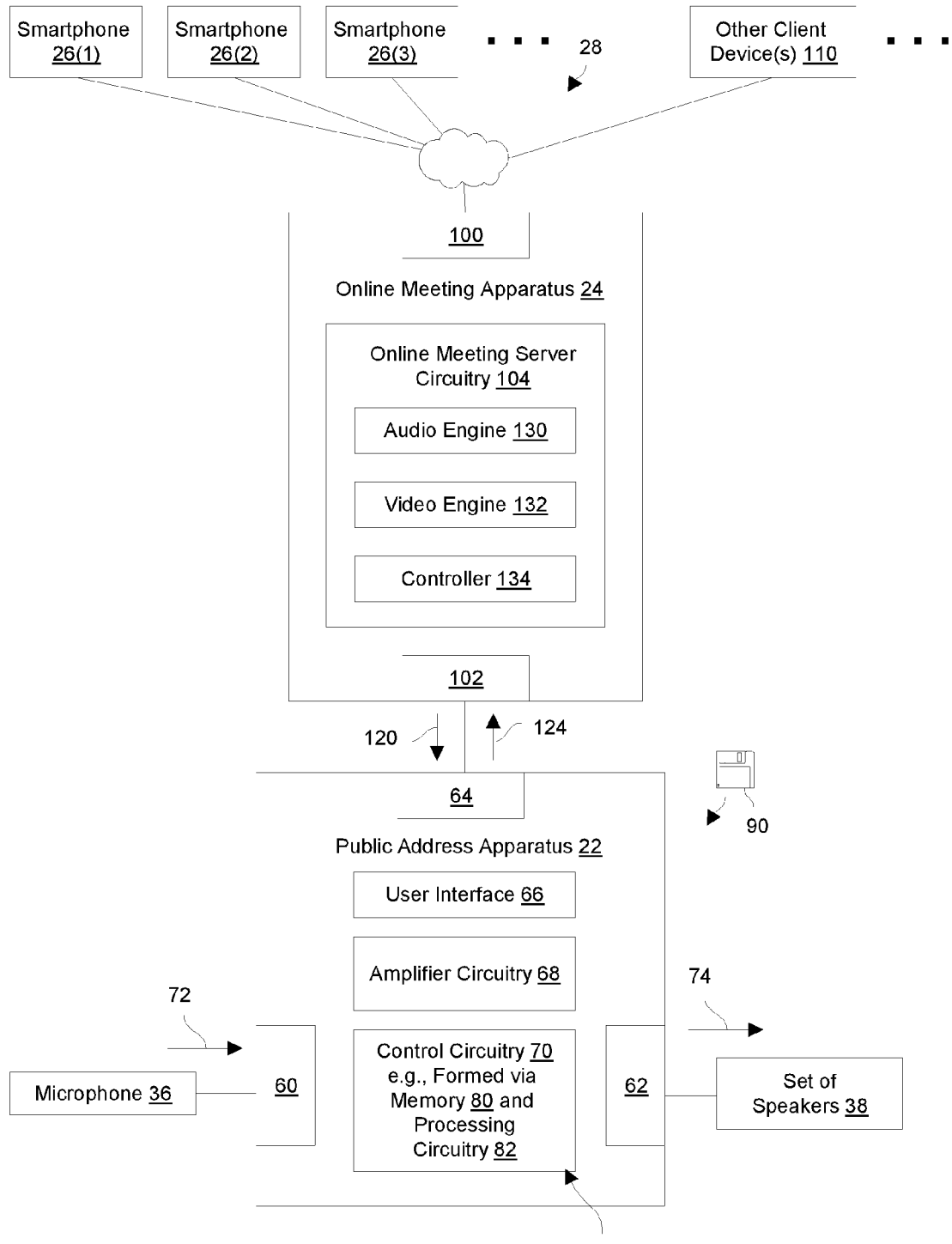
FIG. 2 is a block diagram of particular details of a public address system apparatus and an online meeting apparatus of the electronic setting of FIG. 1.

FIG. 2 shows particular details of the public address system apparatus 22 and the online meeting apparatus 24 in a configuration to carry out a public address system session 40. It should be understood that the public address system apparatus 22 and the online meeting apparatus 24 can be co-located (e.g., within the same room, within the same electronic cabinet and share hardware, within the same chassis, etc.). Alternatively, the public address system apparatus 22 and the online meeting apparatus 24 can be separated and reside at different physical locations (e.g., within different cabinets or chassis, in different rooms or buildings, in different cities, etc.). In some arrangements, the public address apparatus 22 resides at the common physical location 34 and the online meeting apparatus 24 resides in the cloud (e.g., at a remote server farm).

As shown in FIG. 2, the public address apparatus 22 includes a microphone 36, a set of speakers 38, a microphone interface 60, a speaker interface 62, an online meeting apparatus interface 64, a user interface 66, amplifier circuitry 68, and control circuitry 70. The microphone 36 senses sound (e.g., the voice of the local human presenter 30) and conveys a microphone signal 72 carrying that sound to the amplifier circuitry 68 via the microphone interface 60. Similarly, based on the microphone signal 72, the amplifier circuitry 68 generates a set of speaker signals 74 carrying that sound and provides the set of speaker signals 74 to the set of speakers 38 via the speaker interface 62.

The online meeting apparatus interface 64 of the public address apparatus 22 is constructed and arranged to connect the online meeting apparatus 24 (also see the electronic communications channel 54 in FIG. 1). Once communications is established with the online meeting apparatus 24, the online meeting apparatus interface 64 is able to receive signals (e.g., input from the online meeting apparatus 24 to share with the local human audience 32) and transmit signals (e.g., the voice of the local human presenter 30 to share with participants of an online meeting). In some arrangements, the online meeting apparatus interface 64 includes Audio/Video ports (e.g., A/V jacks, RCA connectors, etc.). In some arrangements, the online meeting apparatus interface 64 includes an interface to a computerized network.

The user interface 66 of the public address apparatus 22 is constructed and arranged to receive control input from a user of the public address apparatus 22 to control the operation of the control circuitry 70. Such control input may include various instructions directing the control circuitry 70 to select or mix particular audio input for processing by the amplifier circuitry 68, to select video to display to the local human audience 32 (e.g., text, tabulated votes, slides of a slide show, other presentation material, links/instructions/barcodes enabling smartphone users 50 to join with the public address apparatus 22, etc.) and so on.

In some arrangements, the control circuitry 70 is formed via memory 80 and processing circuitry 82. The memory 80 is intended to represent both volatile storage (e.g., DRAM, SRAM, etc.) and non-volatile storage (e.g., flash memory, magnetic disk drives, etc.). The memory 80 stores a variety of software constructs including an operating system 84, a set of specialized applications 86 which control the operation of the public address apparatus 22, and perhaps other memory constructs 88 (e.g., presentation material, video data, etc.). The processing circuitry 82 is constructed and arranged to operate in accordance with the various software constructs stored in the memory 80. In particular, the processing circuitry 82, when executing the operating system 84, manages various resources of the public address apparatus 22 (e.g., memory allocation, processor cycles, etc.). Additionally, the processing circuitry 82 executing the set of specialized applications 86 forms the control circuitry 70 which controls the operation of the public address apparatus 22.

It should be understood that the above-mentioned controller may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the public address apparatus 22. The computer program product 90 has a non-transitory and non-volatile computer readable medium which stores a set of instructions to control one or more operations of the public address apparatus 22. Examples of suitable computer readable storage media include tangible articles of manufacture and apparatus which store instructions in a non-volatile manner such as CD-ROM, flash memory, disk memory, tape memory, and the like.

As further shown in FIG. 2, the online meeting apparatus 24 includes a network interface 100, a public address apparatus interface 102 and an online meeting server circuitry 104. The network interface 100 enables the online meeting apparatus 24 to communicate with the smartphones 26 through the communications medium 28. In some arrangements, the network interface 100 enables the online meeting apparatus 24 to communicate with other types of electronic client devices 110 as well such as tablets, laptop computers, desktop computers, workstations, general purpose computers, general computerized terminals, and so on.

The public address apparatus interface 102 enables the online meeting apparatus 24 to communicate with the online meeting server circuitry 104 (also see the electronic communications channel 54 in FIG. 1). It should be understood that communications between the public address apparatus 22 and the online meeting apparatus 24 can include a set of signals 120 carrying, among other things, voice input from the smartphones 26. Accordingly, such voice input can be shared over the speakers 38 of the public address apparatus 22. Similarly, communications between the public address apparatus 22 and the online meeting apparatus 24 can include a set of signals 122 carrying, among other things, voice input from the microphone 36 of the public address apparatus 22. As a result, voice input from the local human presenter 30 (also see FIG. 1) can be shared with users of any of the client devices of the online meeting apparatus 24 such as the smartphones 26 and other client devices 110 in a manner similar to that of an online meeting.

The online meeting server circuitry 104 of the online meeting apparatus 24 includes an audio engine 130, a video engine 132, and a controller 134 and, is constructed and arranged to host online meetings. To this end, the audio engine 130 combines audio input from the smartphones 26 (and perhaps the other client devices 110) for sharing (also see the set of signals 120 in FIG. 2) during online meetings. For example, the audio engine 130 is capable of providing an aggregated audio signal which includes audio input from all of the client devices simultaneously. Additionally, the audio engine 130 is capable of providing separate audio signals which respectively include distinct audio input from the client devices individually.

Similarly, the video engine 132 of the online meeting apparatus 24 combines video input from the smartphones 26 (and perhaps the other client devices 110) for sharing (also see the set of signals 122 in FIG. 2) during online meetings. For example, the video engine 132 is capable of providing a combined video signal which includes video input from all of the client devices simultaneously. Furthermore, the video engine 132 is capable of providing separate video signals which respectively include distinct video input from the client devices individually.

The controller 134 of the online meeting apparatus 24 controls the operation of the online meeting server circuitry 104 in response to commands. Along these lines, the controller 134 can respond to commands from the local human presenter 30 via the public address apparatus 22, from a particular user 50 of a client device, from a human administrator, and so on. Such commands may direct the online meeting apparatus 24 to create an online meeting session in which the users 50 of the smartphones 26 (and perhaps the other client devices 110) are able to join in, stop the online meeting session, select among different audio and/or video input for sharing with the public address apparatus 22 (i.e., to make one or more of the audio and/or video feeds available to the public address apparatus 22), and so on.

During operation, the tandem of the public address apparatus 22 and the online meeting apparatus 24 are able to cooperatively include input from a smartphone 26 during a public address system session in order to improve the user experience. For example, if the microphone 36 of the local human presenter 30 fails and there are no backup microphones available, the local human presenter 30 is able to simply join a smartphone 26 to the public address system session and thereafter project voice input from the set of speakers 38 of the public address apparatus 22 via that smartphone 26. In some arrangements, the public address apparatus 22 performs an echo suppression operation on the smartphone audio input to suppress echo (i.e., to prevent the microphone of the smartphone 26 from picking up noise from the set of speakers 38 and creating an audio feedback loop).

As another example, when it is desirable for a member of the local human audience 32 to use the public address apparatus 22, the member of the audience can simply join to the public address apparatus 22 via a smartphone 26 thus alleviating the need for the local human presenter 30 to physically pass the microphone 36 or enlist the assistance of a mic runner. Likewise, attendees conferencing at remote satellite locations have means to participate from their remote satellite locations, e.g., to utilize their smartphones 26 to ask questions, to make comments, and so on.

It should be understood that, in some arrangements, the control circuitry 70 of the public address apparatus 22 and/or the controller 134 of the online meeting apparatus 24 is augmented so that additional content from the online meeting apparatus 24 is shared via the public address apparatus 22, and that content from the public address apparatus 22 is shared with the client devices 26, 110 joined to the online meeting apparatus 24. In particular, the operation of the public address apparatus 22 leverages off of the access to the specialized smartphone features such as their integrated microphones, cameras, and touchscreens.

For example, the smartphones 26 can be provisioned with a special application (or smartphone app) that enables the smartphones 26 to easily join public address system sessions. In some arrangements, the users 50 simply aim cameras of the smartphones 26 to capture or scan the image of a barcode to join a particular public address system session 40, e.g., the barcode can be projected on a projection screen, a large monitor, a wall, a billboard, a handout, and so on. In some arrangements, the users 50 simply select a link, type in a URL, enter a unique meeting identifier (or meeting ID), etc. to join the particular public address system session.

In some arrangements, the presenter 30 pushes out a link or directs the users 50 run a specialized app at the onset of the meeting which then allows the presenter 30 to later transition their smartphones 26 to a "participation mode" (e.g., a question and answer mode, a voting mode, etc.). Once the smartphones 26 are in this "participation mode", the presenter 30 is able to receive smartphone input from the audience. Such arrangements alleviate the need for each member of the audience to initiate a join operation during the meeting. Rather, the presenter/moderator 30 can simply broadcast a query (e.g., "Do you have a question?", "Please vote", etc.) to which the audience can then respond (e.g., by enqueuing their questions, by providing their votes, etc.).

As another example, the users 50 of the smartphones 26 are able to share their faces with the audience of the public address system session via the smartphone cameras. Such operation enables the audience to attach a face with the voice input.

As yet another example, the users 50 of the smartphones 26 are able to enter hand-typed questions, topics, or suggestions for evaluation by the local human presenter 30 and/or the audience. Along these lines, the users 50 are able to submit topics for discussion, answers, votes on topics, and so on. An example of such operation will now be provided with reference to FIGS. 3 and 4.

FIGS. 3 and 4 show, by way of example only, visual information that can be submitted to the local human presenter 30 by smartphones 26 and/or shared among the entire audience (i.e., the local human audience 32, satellite audiences, individual attendees, etc.) during a public address system session 40. FIG. 3 shows a touchscreen display of a smartphone 26 which has joined the public address system session. FIG. 4 shows example voting output which is achievable during the public address system session.

As shown in FIG. 3, each user 50 is able to navigate to a variety of selections which were perhaps submitted by the audience during the public address system session (e.g., Suggestion #1, Suggestion #2, . . . ). In some arrangements, the local human presenter 30 is able to pre-screen this text input before it is shared with the audience. Moreover, the users 50 can select or vote for a particular item (e.g., by touching the touchscreen over that item). The circuitry of the public address apparatus 22 and/or the online meeting apparatus 24 is capable of managing identification of the client devices to ensure that each users 50 votes only once. It should be understood that some of the users 50 may form part of the local human audience 32, but that other users 50 may reside at other locations (e.g., at remote satellite locations, as individual participants, on the road, etc.). Accordingly, input can be obtained from the entire audience regardless of where the audience members are located.

As shown in FIG. 4, the circuitry of the public address apparatus 22 and/or the online meeting apparatus 24 is able to tabulate the votes from the users 50, and then display the voting results to the local human presenter 30 and the audience. Again, the displayed content can be shared with the local human audience 32 (e.g., via a projector or large screen) as well as to remote users (e.g., via satellite projectors, via smartphones, via monitors/screens of the other client devices 110, and so on). Such operation enables the audience members to be more actively engaged thus improving the users' experience.

Furthermore, the local human presenter 30 can enter commands via the user interface 66 (FIG. 2) to control mixing of the various audio inputs (e.g., include or remove particular audio inputs from being output on the set of speakers, change amplitude, etc.). Along these lines, the various circuits of the public address apparatus 22 operate as a mixing circuit having (i) a microphone input which receives a microphone signal carrying audio from the local human presenter (see the microphone signal 72 in FIG. 2), (ii) an online meeting input which receives an online meeting signal from the online meeting server, the online meeting signal carrying audio from the user of the smartphone (see the set of signals 120 in FIG. 2), and (iii) an output coupled to the set of speakers. Here, the circuitry generates an output signal based on the microphone signal and the online meeting signal, and provides the output signal from the output to the set of speakers (see the set of speaker signals 74 in FIG. 2). The output signal includes the audio from the local human presenter 30 and the audio from the user 50 of the smartphone 26 at adjusted volume levels. Further details will now be provided with reference to FIG. 5.

Figure 5:
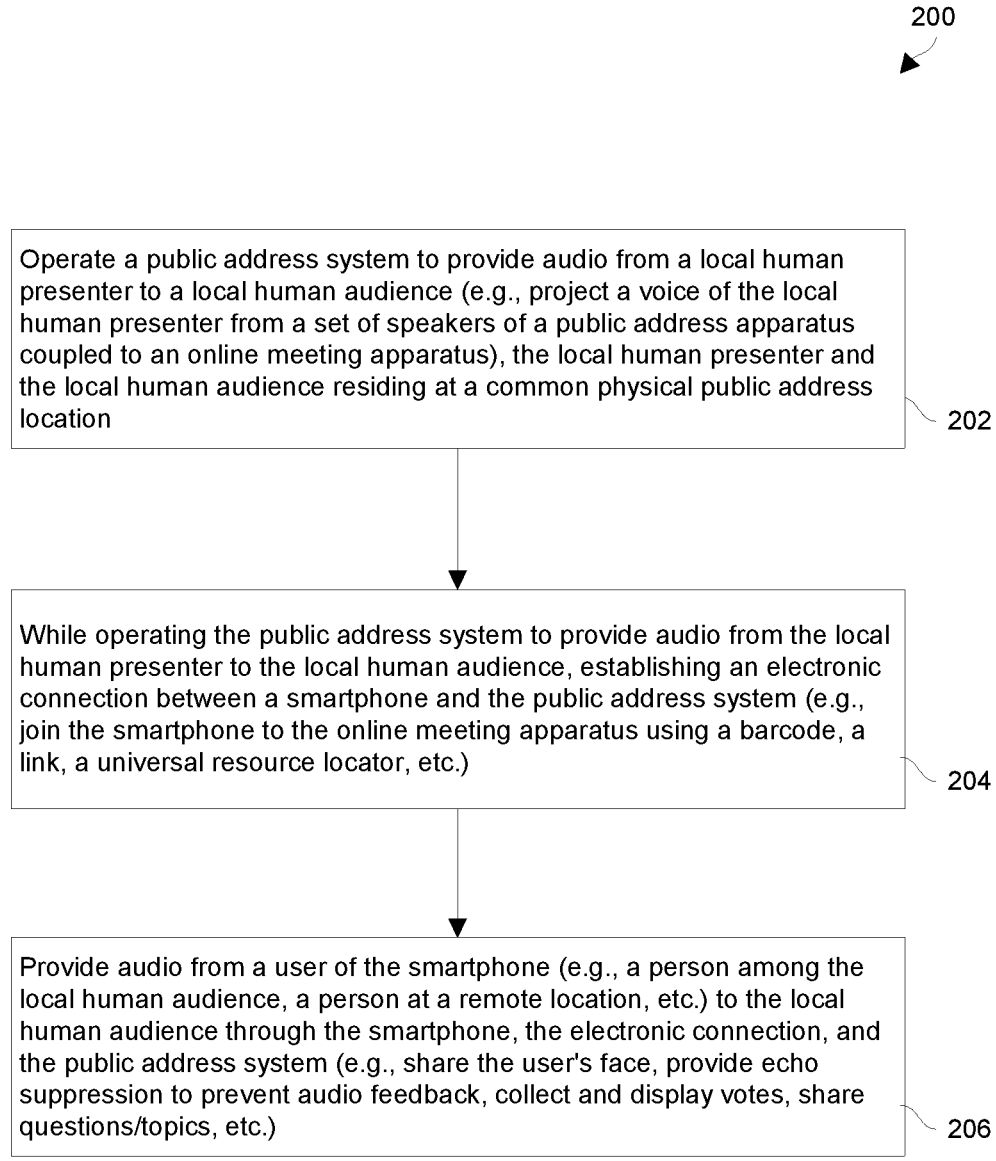
FIG. 5 is a flowchart of a procedure which is performed during the public address system session.

FIG. 5 is a flowchart of a procedure 200 which is performed during a public address system session (e.g., by the public address apparatus 22, by a person, etc.). At 202, the public address apparatus 22 is operated to provide audio from a local human presenter to a local human audience. The local human presenter and the local human audience reside at a common physical public address location (e.g., a large conference room, an auditorium, an arena, a stadium, etc.). In particular, the speakers of the public address apparatus 22 project a voice of the local human presenter to the local human audience and perhaps to satellite or remote users.

At 204, while operating the public address apparatus 22 to provide audio from the local human presenter to the local human audience, an electronic connection is established between a smartphone 26 and the public address system (e.g., see the public address apparatus 22 in FIGS. 1 and 2). Such joining may be facilitated by capturing a barcode using a camera of the smartphone, and resolving the barcode into a unique public address system session ID, using a link, manually typing the session ID, and so on.

At 206, after establishing the electronic connection between the smartphone 26 and the public address system, audio is provided from a user 50 of the smartphone 26 to the local human audience through the smartphone, the electronic connection, and the public address system. During such operation, the public address apparatus 22 can perform other operations such as echo suppression to prevent feedback noise, share a user's face in addition to the user's voice, display questions/topics/etc., collect and display votes/etc., and so on.

As described above, improved techniques are directed to utilizing a smartphone 26 during a public address system session. In particular, while an enhanced public address apparatus 22 operates to provide audio from a local human presenter 30 to a local human audience 32, a smartphone user 50 is able to establish an electronic connection between the smartphone 26 and the public address apparatus 22, and then contribute via the smartphone 26, the electronic connection, and the public address apparatus 22.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described electronic setting 20 includes a public address apparatus 22 and an online meeting apparatus 24 working in tandem. In some arrangements, the form factor is a single apparatus which provides the public address system operability (i.e., an in-the-room PA system) as well as the ability to connect with smartphones 26. In these arrangements, the online meeting apparatus interface 64 can simply be a port which enables access to the smartphones (e.g., WIFI access, a computer network port, a telephone system interface, any other type of online AV receiver that can plug into the in-the-room PA system, etc.).

Based on the above-provided description, one should appreciate that, when traditionally participating in large group events, for example an All-Hands conference meeting or "Fireside chat" forum-style event, there often comes a time to open up the floor to questions, or an otherwise more open discussion. If the venue is even a moderate size, conventional public address systems (a mic and speakers) are typically used, and in order for general audience members to participate (ask a question, make a comment, etc.), they need access to a microphone. In smaller venues, this means having the audience pass a microphone to the speaker. In larger venues, potential speakers either make their way to a static microphone on a stand, or there are dedicated persons ("mic runners") who find people and hand off the mic.

One deficiency with these traditional setups is that these microphones can be a single point of failure. If microphone fails, there are typically very few (sometimes none) to take their place. Another drawback is that the mic runners sometimes do not notice everyone with a question, and even if they are very good at their jobs they cost money to employ, and their time could be better spent doing less menial, more technical audio-video tasks. Furthermore, for large group events that have a remote video conferencing component, remote viewers are often completely left out of the audience participation segment since they have no means to speak to the meeting as a whole.

With these problems in mind, the improved techniques enable involvement of smartphones (e.g., via a distributed microphone app). That is, such techniques enable the use of microphones that exist as part of smartphones for audio input to a conference's audio system. By leveraging these microphones, the number of redundant devices it greatly increased since there are often as many smartphones as audience members. Additionally, personnel is freed up by providing the means to manage selection of questions and automatic pairing of these devices to the audio system (i.e., mic runners are unnecessary). Furthermore, remote audience members now have access (e.g., by leveraging the Internet for matchmaking and audio transmission).

In an alternative arrangement to that provided above in connection with FIGS. 1 and 2, there are three major components in the system: a) moderator device (e.g., a local computer with amplifier circuitry or a connection to a main audio system), b) audience device (e.g., a smartphone), and optionally c) matchmaking server/infrastructure. Note that the matchmaking infrastructure could exist on the same device as the moderator device (e.g., see the additional software constructs 88 in FIG. 2) or perhaps even the audience device.

The moderator device can be a laptop, tablet or smartphone, and what sets this device apart is that it is directly tied to the amplifier circuitry. All audio that gets passed to the speakers will go through this moderator device. This moderator device may also handle administration of the session, using, for example, chat room functionality (creating a "room", participant approval, blacklisting, etc.). Accordingly, the moderator device operates as a mini online meeting server (also see the online meeting apparatus 24 in FIG. 2).

The audience device is typically a standard smartphone with at least a microphone and Internet connectivity, but optionally with other features such as a camera, near-field radio communication (NFC), etc. This device will somehow connect to the matchmaking infrastructure (e.g. by accessing a URL, scanning a QR code, acting on in response to a network advertisement) and join the same session as the moderator device.

When the time comes for the audience member to be heard over the set of speakers, the moderator device and the audience device will coordinate through the matchmaking infrastructure and establish a channel that sends microphone input from the audience device to the moderator device in real time.

In some situations, one person may have the floor at a time (e.g., at a large meeting). In such situations (i.e., more generally linking smartphone handset microphones into general audio systems), there may be no need for gate keeping and administration of the moderator device. For example, in a video conference setting, the room's PA system could be used for audio output, but smartphones distributed throughout each location could cooperatively act as the audio input for the room. Each device's mic would become active as a person speaks into the phone, based on a threshold volume, but the audio would all be mixed together before being sent to other remote locations. In this way, every participant would be able to speak to the larger group without being explicitly called on by a central moderator. Other audio processing techniques are suitable for use as well such as an advanced technique of processing multiple audio input signals to generate a new signal which contains the isolated voice of just one speaker that was not directly captured by any one microphone.

In some situations, there is assumed to be a single moderator calling on (choosing) audience devices that will activate and send audio. First, this functionality could be enhanced by requiring the audience members to type a brief form of their question, which the moderator can use to prioritize questions. Taken a step further, this prioritization functionality could then occur through crowd-sourced means, where other audience members use their devices to vote "up" questions that they feel should be answered, and vote "down" questions that they feel are less important. Then, when the moderator is ready for the next question, the audience member who submitted the highest priority question would be given the floor.

In certain situations, it is also reasonable that audience members may want to share video along with the audio of their questions, whether for viewing their face as they ask a question, or for showing anything else that is visual and relevant to the discussion (e.g. documents, objects, gestures). In these situations, the images captured by the smartphones can be shared with the audience (e.g., via a projector, a display, etc.). Such modifications and enhancements are intended to belong to various embodiments of the disclosure.

What is claimed is:

1. A method of utilizing a smartphone during a public address system session, the method comprising:
operating a public address system to provide audio from a local human presenter to a local human audience, the local human presenter and the local human audience residing at a common physical public address location;
while operating the public address system to provide audio from the local human presenter to the local human audience, establishing an electronic connection between the smartphone and the public address system; and
after establishing the electronic connection between the smartphone and the public address system, providing audio from a user of the smartphone to the local human audience through the smartphone, the electronic connection, and the public address system;
wherein an online meeting server, which is constructed and arranged to host online meetings, channels an audio signal of a current online meeting to the public address system;
wherein the method further comprises:
joining other client devices to the current online meeting;
wherein the other client devices are smartphones residing at the common physical public address location;
wherein joining the other client devices to the current online meeting includes:
displaying a set of barcodes identifying the current online meeting, the set of barcodes being read via cameras of the smartphones, and
processing input from the smartphones upon the smartphones joining the current online meeting in response to reading the barcodes via the cameras of the smartphones.

2. A method as in claim 1 wherein the public address system includes a set of speakers;
wherein operating the public address system to provide audio from the local human presenter to the local human audience includes projecting a voice of the local human presenter from the set of speakers to the local human audience; and
wherein providing audio from the user of the smartphone to the local human audience includes projecting a voice of the user of the smartphone from the set of speakers to the local human audience.

3. A method as in claim 2
wherein establishing the electronic connection between the smartphone and the public address system includes joining the smartphone as a client device to the current online meeting to convey audio from the user of the smartphone to the local human audience through the online meeting server and the public address system.

4. A method as in claim 3 wherein projecting the voice of the user of the smartphone from the set of speakers to the local human audience includes:
outputting the voice of the user from the set of speakers while the user of the smartphone resides at the common physical public address location to form part of the local human audience.

5. A method as in claim 3 wherein projecting the voice of the user of the smartphone from the set of speakers to the local human audience includes:
outputting the voice of the user from the set of speakers while the user of the smartphone resides at a user location which is remote from the common physical public address location.

6. A method as in claim 3 wherein the public address system further includes a mixing circuit having (i) a first input which receives a microphone signal carrying audio from the local human presenter, (ii) a second input which receives an online meeting signal from the online meeting server, the online meeting signal carrying audio from the user of the smartphone, and (iii) an output coupled to the set of speakers; and
wherein the method further comprises generating an output signal based on the microphone signal and the online meeting signal, and providing the output signal from the output to the set of speakers, the output signal including the audio from the local human presenter and the audio from the user of the smartphone at adjusted volume levels.

7. A method as in claim 6 wherein the mixing circuit further includes a communications interface; and wherein the method further comprises providing the output signal from the communications interface to the online meeting server to convey audio from the local human presenter to participants of the current online meeting.

8. A method as in claim 6, further comprising:
performing an echo suppression operation to suppress echo in the audio from the user of the smartphone.

9. A method as in claim 3, further comprising:
receiving text-based questions from the other client devices joined to the current online meeting; and
displaying the text-based questions to the local human audience via the public address system.

10. A method as in claim 9, further comprising:
receiving votes for the text-based questions; and
displaying results of the votes to the local human audience via the public address system.

11. A method as in claim 9 and wherein the method further comprises:
joining additional smartphones to the current online meeting by rendering links on touch screens of the additional smartphones, and receiving requests to join the current online meeting in response to selection of the links on the touch screens of the additional smartphones.

12. A method as in claim 3 wherein the smartphone includes a camera; and
wherein the method further comprises:
capturing video from the camera of the smartphone to share a view of the user's face with the local human audience.

13. A method as in claim 1, further comprising:
receiving votes electronically entered by users via touchscreens of the smartphones, each vote corresponding to a particular smartphone to ensure that each user votes only once,
electronically generating a voting result based on tabulation of the votes, and
electronically outputting the voting result.

14. A method of utilizing a smartphone during a public address system session, the method comprising:
operating a public address system to provide audio from a local human presenter to a local human audience, the local human presenter and the local human audience residing at a common physical public address location;
while operating the public address system to provide audio from the local human presenter to the local human audience, establishing an electronic connection between the smartphone and the public address system; and
after establishing the electronic connection between the smartphone and the public address system, providing audio from a user of the smartphone to the local human audience through the smartphone, the electronic connection, and the public address system;
wherein the public address system includes a set of speakers;
wherein operating the public address system to provide audio from the local human presenter to the local human audience includes projecting a voice of the local human presenter from the set of speakers to the local human audience; and
wherein providing audio from the user of the smartphone to the local human audience includes projecting a voice of the user of the smartphone from the set of speakers to the local human audience;
wherein an online meeting server, which is constructed and arranged to host online meetings, channels an audio signal of a current online meeting to the public address system;
wherein establishing the electronic connection between the smartphone and the public address system includes joining the smartphone as a client device to the current online meeting to convey audio from the user of the smartphone to the local human audience through the online meeting server and the public address system;
wherein the method further comprises:
joining other client devices to the current online meeting,
receiving text-based questions from the other client devices joined to the current online meeting, and
displaying the text-based questions to the local human audience via the public address system;
wherein the other client devices are smartphones residing at the common physical public address location;
wherein joining the other client devices to the current online meeting includes:
reading barcodes via cameras of the smartphones, and
receiving requests to join the current online meeting in response to reading the barcodes via the cameras of the smartphones.

15. A public address apparatus, comprising:
a set of speakers;
a microphone device;
a control circuit coupled to the set of speakers and the microphone device, the control circuit being constructed and arranged to:
receive, via the microphone device, audio from a local human presenter and output, via the set of speakers, audio received from the local human presenter to a local human audience, the local human presenter and the local human audience residing at a common physical public address location, establish an electronic connection to a smartphone, and after establishing the electronic connection to the smartphone, receive audio from a user of the smartphone and output audio received from the user to the local human audience through the smartphone, the electronic connection, and the set of speakers;

wherein the control circuit includes an online meeting server and a mixing circuit coupled to the online meeting server;

wherein the online meeting server is constructed and arranged to channel an audio signal of a current online meeting to the mixing circuit;

wherein the online meeting server is further constructed and arranged to join other client devices to the current online meeting;

wherein the other client devices are smartphones residing at the common physical public address location;

wherein the online meeting server, when joining the other client devices to the current online meeting, is constructed and arranged to:

display a set of barcodes identifying the current online meeting, the set of barcodes to be read via cameras of the smartphones, and process input from the smartphones upon the smartphones joining the current online meeting in response to reading the barcodes via the cameras of the smartphones.

16. A public address apparatus as in claim 15 wherein the control circuit, when outputting audio received from the local human presenter to the local human audience, is constructed and arranged to project a voice of the local human presenter from the set of speakers to the local human audience; and wherein the control circuit, when outputting audio received from the user of the smartphone to the local human audience, is constructed and arranged to project a voice of the user of the smartphone from the set of speakers to the local human audience.

17. A public address apparatus as in claim 16
wherein the online meeting server of the control circuit joins the smartphone to a current online meeting to establish the connection to the smartphone; and wherein, after the smartphone joins the current online meeting, the mixing circuit conveys audio from the user of the smartphone to the local human audience.

18. A computer program product having a non-transitory computer readable medium which stores a set of instructions to utilize a smartphone during a public address system session, the set of instructions, when carried out by computerized circuitry, causing the computerized circuitry to perform a method of:

operating a public address system to provide audio from a local human presenter to a local human audience, the local human presenter and the local human audience residing at a common physical public address location;

while operating the public address system to provide audio from the local human presenter to the local human audience, establishing an electronic connection between the smartphone and the public address system; and after establishing the electronic connection between the smartphone and the public address system, providing audio from a user of the smartphone to the local human audience through the smartphone, the electronic connection, and the public address system;

wherein an online meeting server, which is constructed and arranged to host online meetings, channels an audio signal of a current online meeting to the public address system;

wherein the method further comprises:
joining other client devices to the current online meeting;

wherein the other client devices are smartphones residing at the common physical public address location;

wherein joining the other client devices to the current online meeting includes:

displaying a set of barcodes identifying the current online meeting, the set of barcodes being read via cameras of the smartphones, and processing input from the smartphones upon the smartphones joining the current online meeting in response to reading the barcodes via the cameras of the smartphones.

19. A computer program product as in claim 18 wherein the public address system includes a set of speakers;

wherein operating the public address system to provide audio from the local human presenter to the local human audience includes projecting a voice of the local human presenter from the set of speakers to the local human audience; and wherein providing audio from the user of the smartphone to the local human audience includes projecting a voice of the user of the smartphone from the set of speakers to the local human audience.

20. A computer program product as in claim 19
wherein establishing the electronic connection between the smartphone and the public address system includes joining the smartphone as a client device to the current online meeting to convey audio from the user of the smartphone to the local human audience through the online meeting server and the public address system.

* * * * *